United States Patent [19]
Hüller

[11] Patent Number: 4,643,648
[45] Date of Patent: Feb. 17, 1987

[54] CONNECTION OF A CERAMIC ROTARY COMPONENT TO A METALLIC ROTARY COMPONENT FOR TURBOMACHINES, PARTICULARLY GAS TURBINE ENGINES

[75] Inventor: Josef Hüller, Munich, Fed. Rep. of Germany

[73] Assignee: Motoren-und Turbinen-Union Munchen GmbH, Munich, Fed. Rep. of Germany

[21] Appl. No.: 546,503

[22] Filed: Oct. 28, 1983

[30] Foreign Application Priority Data

Nov. 12, 1982 [DE] Fed. Rep. of Germany ....... 3241926

[51] Int. Cl.⁴ .............................................. F04F 7/00
[52] U.S. Cl. ............................ 416/241 B; 416/244 R; 419/8; 428/547
[58] Field of Search ........... 416/241 B, 244 R, 244 A; 29/156.8 R; 419/8, 9, 49, 7, 19; 428/547

[56] References Cited

U.S. PATENT DOCUMENTS

| | | | |
|---|---|---|---|
| 2,297,508 | 9/1942 | Schutte | 416/241 B |
| 2,347,386 | 4/1944 | Adams | 415/219 C |
| 2,636,856 | 4/1953 | Suggs et al. | 428/547 X |
| 2,892,503 | 6/1959 | Hood, Jr. et al. | 416/241 |
| 3,604,819 | 9/1971 | Krahe et al. | 416/204 |
| 3,642,383 | 2/1972 | Andvig | 416/244 A |
| 3,940,268 | 2/1976 | Catlin | 416/244 A |
| 4,063,939 | 12/1977 | Weaver et al. | 416/244 A |
| 4,272,954 | 6/1981 | Kronogard | 416/241 B |
| 4,293,619 | 10/1981 | Landingham et al. | 416/241 B |
| 4,324,356 | 4/1982 | Blair et al. | 416/241 B |
| 4,362,471 | 12/1982 | Langer et al. | 416/244 A X |
| 4,424,003 | 1/1984 | Brobeck | 416/241 B |
| 4,492,737 | 1/1985 | Conolly | 419/49 |

FOREIGN PATENT DOCUMENTS

| | | | |
|---|---|---|---|
| 95540 | 12/1983 | European Pat. Off. | 416/244 R |
| 667276 | 10/1929 | France | 416/244 |
| 125302 | 9/1980 | Japan | 416/244 R |

*Primary Examiner*—Robert E. Garrett
*Assistant Examiner*—John Kwon
*Attorney, Agent, or Firm*—Roberts, Spiecens & Cohen

[57] ABSTRACT

The connection of a ceramic rotary component to a metallic rotary component for a turbomachine such as a gas turbine engine wherein the ceramic rotary component comprises a sintered rotor disk of reaction bonded silicon nitride (RBSN) or silicon carbide sintered under no pressure and the metallic rotary component is formed by the hot isostatic pressing of a metallic powder. The metallic rotary component becomes bonded to the sintered rotor disk to form a secure connection therewith. The metallic powder has a coefficient of thermal expansion substantially equal to that of the ceramic rotary component.

5 Claims, 7 Drawing Figures

CONNECTION OF A CERAMIC ROTARY COMPONENT TO A METALLIC ROTARY COMPONENT FOR TURBOMACHINES, PARTICULARLY GAS TURBINE ENGINES

FIELD OF THE INVENTION

This invention relates to the connection of a ceramic rotary component to a metallic rotary component for turbomachines, and more particularly to gas turbine engines, where the ceramic rotary component, for example, a turbine rotor disk, is sintered and finished before the connection is made to the metallic component, for example, a shaft.

PRIOR ART

Turbine rotor disks have recently been proposed for use in turbomachines, particularly in gas turbine engines, where the rotor disk is made of a ceramic material, while the associated turbine shaft is made of a metallic material. A relatively great difficulty is encountered in connecting the ceramic turbine wheel to the metallic shaft such that the connection will safely sustain the elevated temperatures encountered and the local circumferential loads arising from centrifugal forces, and which will be suitable for transmitting relatively high torques.

It is especially true for transient conditions and attending relatively severe fluctuations in temperature that it has been impossible heretofore to provide a particularly positive, intimate joint to connect ceramic and metallic rotary components.

A special problem complicating the mating of such materials is the patently considerable difference in coefficients of thermal expansion of said materials, the coefficient being relatively low for ceramic materials and relatively high for metallic materials.

It has been heretofore attempted to eliminate the above noted problems by joining ceramic elements with metallic components by means of bonded, brazed or welded connections and by providing special follower connections between the ceramic turbine rotor disk and the metallic shaft. But these measures are also deficient, especially due to the comparably great differences in physical properties of metal on the one hand and ceramic materials on the other, to provide satisfactory connections that meet the latest requirements for gas turbine engines, especially with regard to the high temperatures that they require.

The advantages provided by the use of ceramic materials, such as silicon nitride or silicon carbide, is unquestionably their capacity for enduring high thermal loads, their resistance to corrosion and also their relatively low thermal conductivity. As already stated above, the ceramic materials have relatively low coefficients of thermal expansion, especially compared with high alloy steel components. These comparably low coefficients of thermal expansion for the ceramic materials on the one hand, and the comparably high coefficients of thermal expansion for the rotary steel components on the other hand, may in the presence of abrupt jumps in temperature cause the metallic rotary component, i.e. the shaft, to rupture at least in the hub area of the ceramic rotor disk.

Disclosed in DE-OS 28 51 507 is a connecting element used between ceramic and metallic components, which is in the form of a flexible, ceramic insulation spring member to suitably connect the components with their different thermal and elastic properties such that in any operating condition, a flexible connection between said components is maintained. This construction contemplates that the connecting element be a ceramic, thermal insulator to prevent radiation of heat, for example, from the thermally highly stressed ceramic area to the metallic component such that despite considerably different coefficients of thermal expansion of ceramics, on the one hand, and steel, on the other, the steel component will be sufficiently shielded from thermal radiation from the ceramic component to make the thermal expansion of the metallic component in service equal or comparable to that of the ceramic component.

On the other hand, the connecting element disclosed above is not intended to admit of plastic deformation. Rather, it is intended to be a spring member, sufficiently flexible to compensate for still prevailing differences in thermal expansion between the joined ceramic and steel components, and to compensate for deformations under centrifugal load, as it is expected to be resisted mainly by the steel component.

The connecting element is also not expected to ensure the intended structurally intimate connection between the ceramic and the metallic components which is able to provide the requisite flexibility under all operating conditions, expecially in the presence of frequently changing and, thus, greatly varying temperature levels. A further disadvantage of the known construction is the need for a connecting element between the mated ceramic and steel materials to meet the requirements. The disclosure provides no teaching of a suitable method for manufacturing the metallic rotary component such as the shaft, and concurrently achieving, while manufacture is under way, the intended joined connection between the ceramic and the metallic rotary components.

Disclosed in DE-OS 27 37 267 is a method for the hot isostatic pressing (HIP) of ceramic components. The method disclosed produces so called compacts by concurrently applying high pressure all around and high temperature on the material. The pressure applied in the HIP process is of the order of magnitude of 3000 bar, with temperatures ranging from 1400° to 1750° C. at this pressure. In the HIP process, use is made of a gas as a medium to transfer pressure, with nitrogen or argon having been found to be suitable in practical applications; additionally, the use of graphite as a pressure-transfer medium has also been proposed. The disclosed matter, however, gives no teaching whatever of a suitable connection between ceramic and metallic rotary components under the initially cited criteria.

SUMMARY OF THE INVENTION

In a broad aspect the present invention seeks to eliminate the disadvantages associated with the prior art and provides a connection between a ceramic rotary component and a metallic rotary component, such as between a ceramic turbine wheel and a metallic shaft, which ensures intimate positive union especially for transient operations and the attending severe fluctuations in temperature where the connection in the joining area is made flexible without admitting of plastic deformation. Additionally this connection will safely sustain all operating conditions with a view to the centrifugal forces encountered in said joining area and will be suitable for transmitting a relatively high shaft torque.

The invention contemplates the combination of a ceramic rotary component connected to a metallic rotary component for a turbomachine such as a gas turbine engine. The ceramic rotary component comprises a sintered rotor disk of reaction bonded silicon nitride (RBSN) or silicon carbide sintered under no pressure and the metallic rotary component comprises a hot isostatic pressing of a metallic powder intimately bonded to the sintered rotor disk to form a secure connection therebetween. The metallic powder has a coefficient of thermal expansion substantially equal to that of the ceramic rotary component.

In accordance with a feature of the invention, the connection between the ceramic rotary component and the metallic rotary component includes a shaft on one of the components and a sleeve embracing the shaft on the other of the components.

An essential advantage afforded by the connection of the present invention is that the metallic shaft of the metallic rotary component can be made and joined to the ceramic component in the intended manner for a structurally intimate and positive connection. The connection of the present invention concurrently meets the requirement for great tolerance of temperatures and of frequently large alternating temperature loads (thermal shocks) resulting from transient operating conditions, with the connection of the present invention being flexible without admitting of plastic deformation, and ensuring the transmission of comparably high torque loads between the ceramic and the metallic rotary components.

Nickel cobalt steel is used as the metal powder as it has a coefficient of thermal expansion substantially equal to that of the ceramic rotary component. This insures that in service there will be little if any difference in thermal expansion between the metal and ceramic materials that might impair the intended connection. Hence, according to the present invention, use of an additional connecting element as disclosed in DE-OS 28 51 507 is completely obviated.

In order to obtain the connection of the invention there is provided apparatus comprising an envelope mounted on the ceramic rotary component including an annular constructional unit extending from the ceramic rotary component to form an enclosure which is adapted for being sealed to resist high pressure. The apparatus further comprises means for introducing metal powder into the enclosure wherein a high isostatic pressing operation can be carried out on the powder to form, in situ, the metallic rotary component joined to the ceramic rotary component. The envelope including the constructional unit is removable from the ceramic rotary component after formation of the metallic component.

In order to obtain the connection of the invention, there is provided a method which comprises providing a ceramic rotary component comprising a sintered rotor disk and mounting an envelope on said rotary component to form a sealable enclosure therewith adapted to resist high pressure. The method further comprises introducing into said enclosure metal powder having a coefficient of thermal expansion substantially equal to that of the ceramic rotary component, sealing said enclosure and effecting a high isostatic pressure operation on the metal powder to form, in situ, in said envelope, the metallic rotary component joined to the ceramic rotary component. The envelope is then removed after the formation of the metallic rotary component.

BRIEF DESCRIPTION OF THE VIEWS OF THE DRAWING

The invention is described more fully with reference to the accompanying drawing, in which.

DETAILED DESCRIPTION

Figures 1, 2:
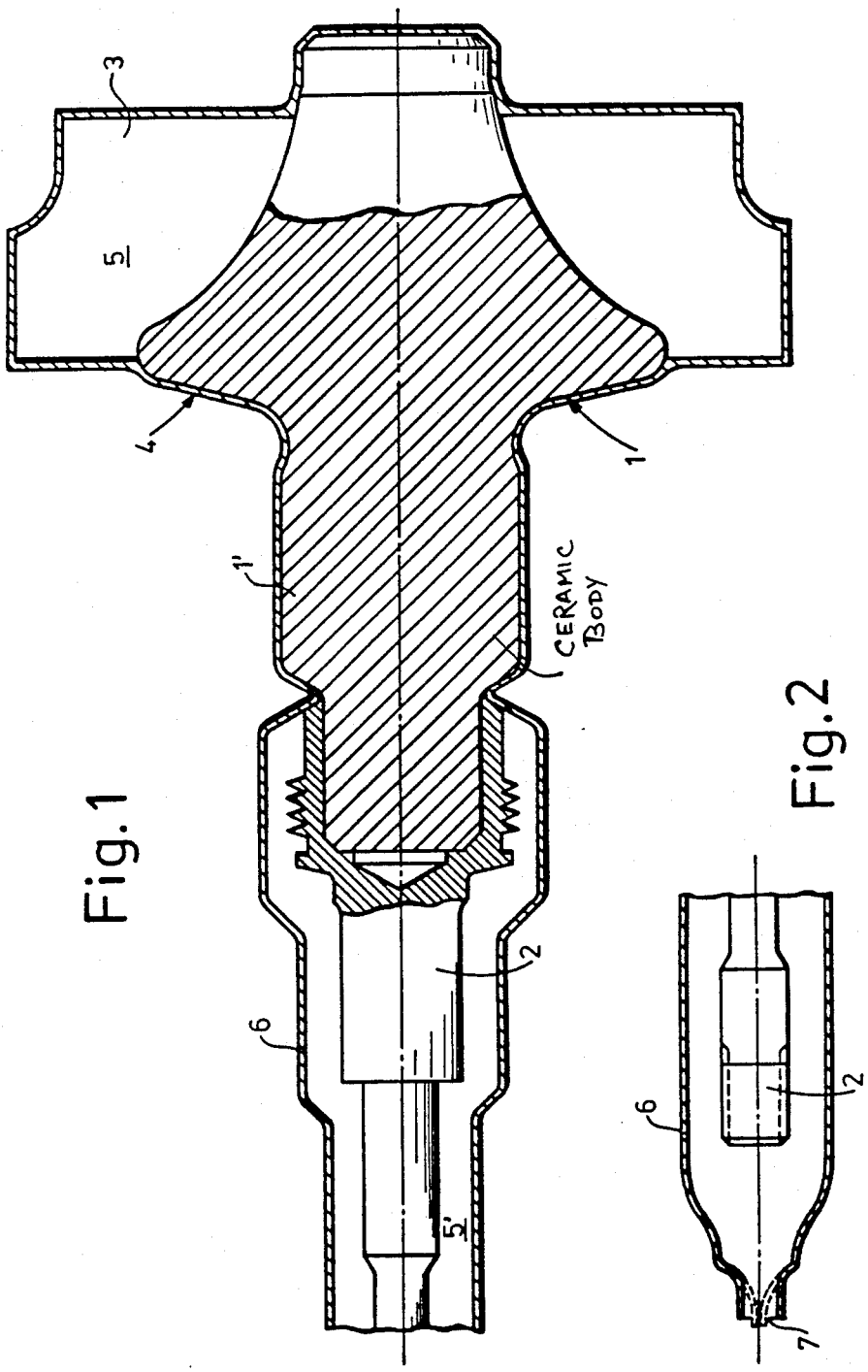
FIG. 1 is a longitudinal view, partly in section, illustrating a turbine disk-to-shaft connection plus associated equipment for carrying out the HIP process.
FIG. 2 illustrates the left-hand shaft end of FIG. 1 plus the final shape of the envelope section of the equipment, which contains a feed port for the metal powder.

FIG. 1 illustrates a ceramic centrifugal-flow rotor disk 1 of a turbine connected by an associated shaft extension 1' to a metallic shaft 2. In this connection, the production of which will be described more fully below, a sleeve-like end of the metallic shaft 2 positively embraces the shaft extension 1' projecting centrally from the rotor disk 1 in an axial direction. Before the connection is made, the ceramic rotor disk has already been sintered and finished. The ceramic rotor disk also has centrifugal-flow rotor blades 3, which are likewise made of a ceramic material, i.e. together with the disk. The ceramic rotor disk 1 preferably is manufactured from reaction-bonded silicon nitride (RBSN) or silicon carbide ($SS_iC$) sintered without pressure. The metallic shaft 2 is formed, in situ, by the HIP process, to be described more fully below, from a given quantity of metal powder and is concurrently joined to the ceramic rotary component i.e. the ceramic rotor disk 1 in a positive connection. The metal powder or powdery substance is a material which has a coefficient of thermal expansion substantially equal to that of the ceramic rotor disk 1.

In a preferred embodiment of the present invention, the metal powder is EPC 10, a nickel cobalt steel according to MTN specification 12189, which has a relatively low coefficient of thermal expansion of, for example, $3.85 \times 10^{-6}/°C$. up to 300° C. and $4.6 \times 10^{-6}/°C$. up to 400° C.

The HIP process used to manufacture the connection of the present invention employs an envelope 4 (FIG. 1) made of steel sheet, and particularly, a maximally corrosion resistant steel which will resist oxidation. The wall thickness of the envelope 4, of steel sheet is about 1.5 mm. The envelope 4 embraces the ceramic rotor disk 1 and shaft extension 1' on the one hand forming spaces 5 between the centrifugal-flow blades 3 for preventing the fully finished rotor disk 1 from being disturbed in any manner by the subsequent HIP process. The envelope 4 also includes a cylindrical constructional unit 6, which can be sealed all around to withstand elevated pressure and which is adapted at least partially to suit the subsequent shape of the metallic shaft 2. The cylindrical constructional unit 6 (FIG. 2) has at its left-hand end, a feed port 7 to receive the metal powder, which port can be hermetically sealed, to withstand pressure, at the extreme edges as shown in the drawing by the dotted lines, with the constructional unit providing the additional volume 5' needed in the HIP process for metal powder compaction into the finished metallic shaft 2. After the HIP process, the envelope 4 is removed together with the cylindrical constructional unit 6.

The intervening spaces 5 between the centrifugal-flow blades 3, and the external envelope 4, can be filled with quartz powder before the HIP process commences, the powder then being readily removed after the HIP process as a vitreous substance together with the envelope 4 from the rotor disk 1 and the centrifugal-flow blades 3.

Figure 3:
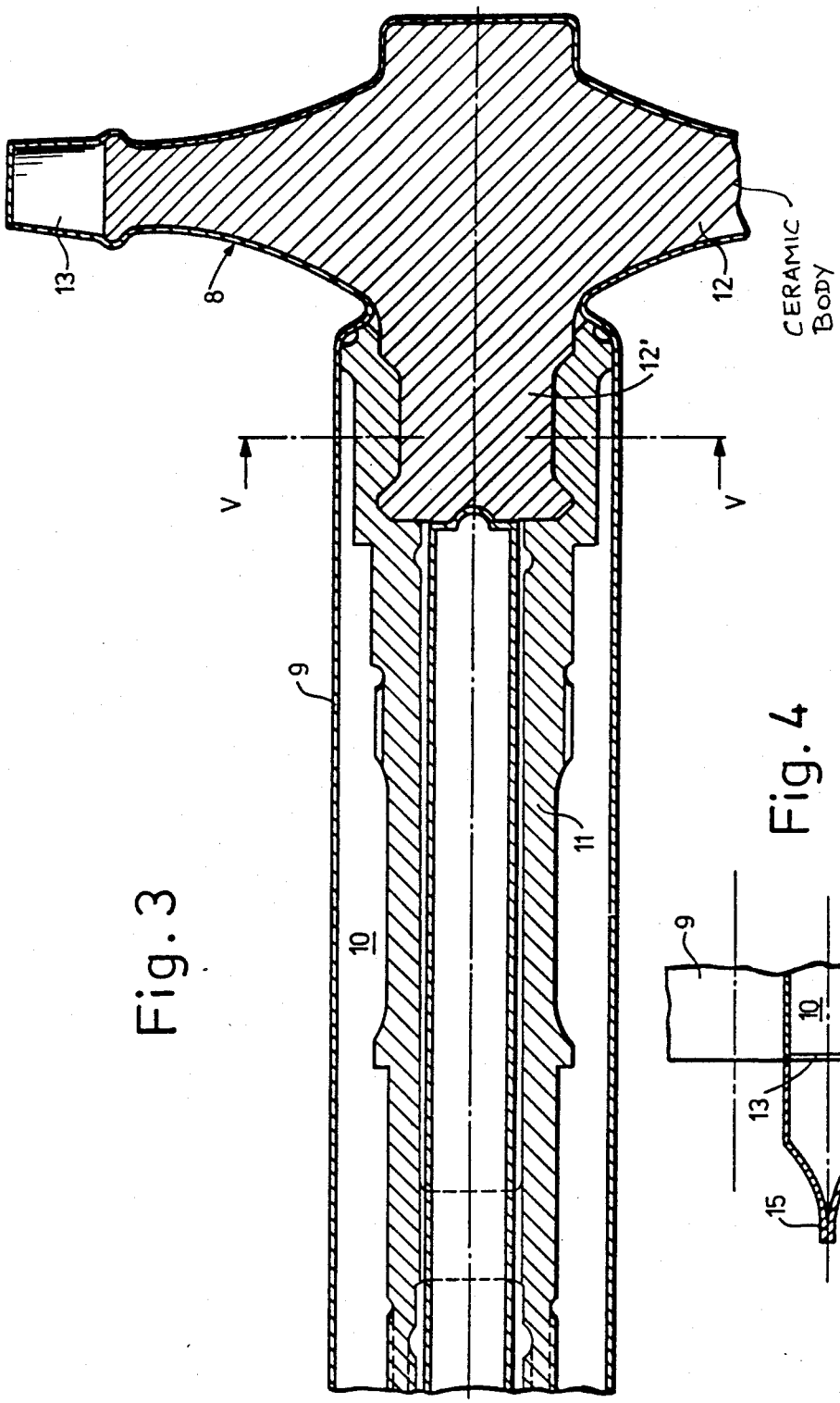
FIG. 3 is a longtidudinal sectional view illustrating a further embodiment of a turbine disk-to-shaft connection plus associated equipment for carrying out the HIP process.
Figure 4:
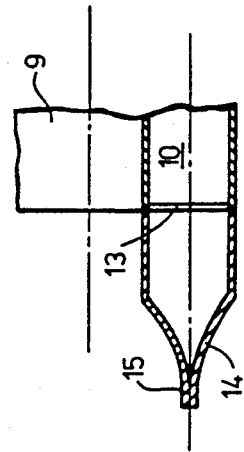
FIG. 4 illustrates the envelope end of the device of FIG. 3 plus the metal powder feed port (shown sealed), partially broken away and in section.
Figure 5:
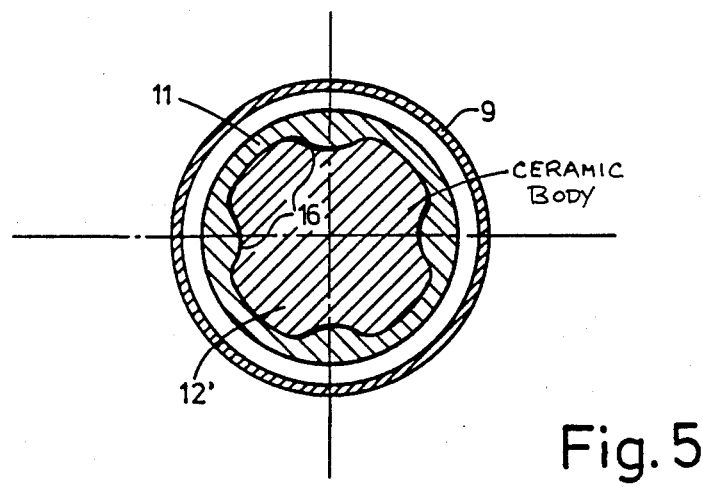
FIG. 5 is a sectional view of the connection taken on line V—V in FIG. 3.

The embodiment of FIGS. 3, 4 and 5 comprises a ceramic axial-flow turbine disk 12 having axial-flow rotor blades 13 and a ceramic shaft extension 12' positively embraced by the sleeve-shaped end of a tubular shaft 11 produced by the HIP process. For the simultaneous manufacture of the metallic tubular shaft 11 and the metal-to-ceramic connection between the shaft 11 and the extension 12', the device used for implementing the HIP process, which comprises the cylindrical constructional unit 9 associated with the envelope 8, is in the form of a tubular shaft or hollow annular cylinder surrounding the tubular metallic shaft 11 which is produced via the annular space 10 during the HIP process. For the HIP process, a metal powder feed port 13 (FIG. 4) of the cylindrical constructional unit 9 is hermetically sealed by the inwardly bent, meeting ends 14 and 15 of a tube end preceding the port 13.

The connection between the ceramic and metal shafts according to the invention provides circumferential and axial fixation between the shafts which permits transmission of torsional forces. This locked condition is achieved by a suitably shaped contour of the outer wall structure of the ceramic rotary component, which is finished before the HIP process commences, the corresponding metallic connecting section being made to conform to the contour by the HIP process for a positive connection.

Figure 6:
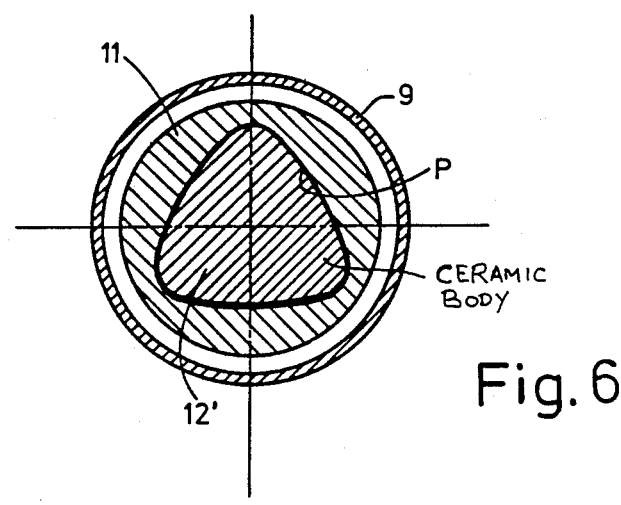
FIG. 6 is similar to FIG. 5 but shows a modified connection.

The axial and circumferential locked attachment between the metal and ceramic shafts can be achieved, for example, by the suitable shaping of the contour of the outer wall structure of the previously finished ceramic component, or its shaft extension 12'. In this regard the contour can be formed with equally spaced scallops 16 as shown in FIGS. 3 and 5 or be of polygonal section P, as shown in FIGS. 6 and 7.

Figure 7:
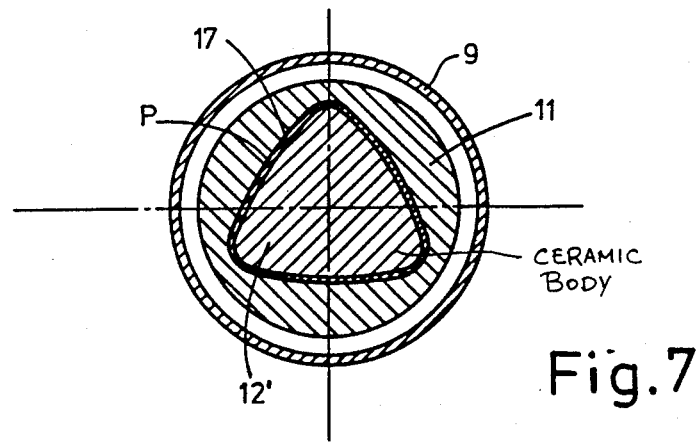
FIG. 7 is a modified version of FIG. 6 characterized by the additional use of thermal insulation.

In the connection shown in FIG. 7 a thermal insulation layer 17, for example, of aluminum titanate ($Al_2TiO_5$) is arranged in the joint area between the ceramic rotary consequent i.e. shaft extension 12' and the metallic rotary component, i.e. shaft 11. For best results, the aluminum titanate layer is deposited or sprayed onto what will later be the joining area of the ceramic rotary component before the HIP process commences. This thermal insulation layer will be beneficial whenever severe abrupt temperature variations are expected in service on the ceramic disk, on the one hand, and on the metallic shaft on the other. A thermal insulation layer of this nature, therefore, is suited especially for high-temperature applications in gas turbine engines, where it will prevent an undesirably free flow of heat from the ceramic material to the metallic material. Thereby, metallic materials may be used for the shaft of higher coefficients of thermal expansion than those of the ceramic rotor disk, as thermal expansion of the metallic material will then not be appreciably worse than those expected from the ceramic rotor disk 1 of corresponding construction.

For advancing the connection, use can additionally be made of a coarsely structured or roughened outer contour of the finished ceramic rotary component at least in the region of the shaft extension to be joined with the metallic component to be formed. As a result of the HIP process, the metallic rotary component i.e. the sleeve-shaped end of the respective metallic shaft, can be made to engage or "mesh" with the textured surface of the ceramic rotary component at least at its shaft extension. This process could be considered to be a type of surface sintering.

While the invention has been disclosed in relation to preferred embodiments thereof, it will become apparent to those skilled in the art that numerous modifications and variations can be made within the scope and spirit of the invention as defined in the claims.

What is claimed is:

1. The combination of a ceramic rotor wheel connected to a metallic shaft of a turbomachine suh as a gas turbine engine, said ceramic rotor wheel comprising a pre-formed element including a rotor disk of a material selected from the group consisting of reaction-bonded silicon nitride (RBSN) and silicon carbide sintered under no pressure and a solid shaft extension integral with said disk, said metallic shaft comprising a sleeve surrounding said shaft extension of said wheel and formed concurrently with the connection to said shaft extension by a hot isostatic pressing of a metallic powder intimately bonded to said shaft extension to form a secure connection therebetween, said metallic powder having a coefficient of thermal expansion substantially equal to that of said ceramic rotor wheel.

2. The combination as claimed in claim 1 wherein said shaft extension has a textured surface in the region of its connection to said metallic sleeve, said textured surface being formed by a coarse structure of the ceramic structure of the ceramic material of said shaft extension.

3. The combination as claimed in claim 1 comprising a thermal insulation layer of aluminum titanate at said connection between the ceramic and metallic components.

4. The combination as claimed in claim 1 wherein said metal powder is EPC 10 which is a nickel cobalt steel which has a low coefficient of thermal expansion.

5. The combination as claimed in claim 1 wherein said shaft extension and sleeve have a non-circular contour at said connection to promote circumferential locking at said connection and consequent capability to transmit torque thereat.

* * * * *